United States Patent
Oke et al.

(10) Patent No.: US 6,816,221 B2
(45) Date of Patent: Nov. 9, 2004

(54) LIQUID CRYSTAL DISPLAY DEVICE

(75) Inventors: Ryutaro Oke, Mobara (JP); Takahiro Ochiai, Mobara (JP); Kikuo Ono, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 10/455,423

(22) Filed: Jun. 6, 2003

(65) Prior Publication Data

US 2003/0227590 A1 Dec. 11, 2003

(30) Foreign Application Priority Data

Jun. 6, 2002 (JP) ........................................ 2002-165061

(51) Int. Cl.[7] .............................................. G02F 1/1343
(52) U.S. Cl. ........................................ 349/141; 349/39
(58) Field of Search ........................... 349/141, 39, 38, 349/42, 43, 139, 143

(56) References Cited

U.S. PATENT DOCUMENTS

| | | | | |
|---|---|---|---|---|
| 5,598,285 A | * | 1/1997 | Kondo et al. | 349/39 |
| 5,831,707 A | * | 11/1998 | Ota et al. | 349/141 |
| 6,014,190 A | * | 1/2000 | Kim et al. | 349/39 |
| 6,724,454 B2 | * | 4/2004 | Kim et al. | 349/141 |
| 6,738,108 B2 | * | 5/2004 | Ohta et al. | 349/39 |
| 6,741,312 B2 | * | 5/2004 | Komatsu | 349/141 |
| 6,741,313 B2 | * | 5/2004 | Kim et al. | 349/141 |
| 6,744,482 B2 | * | 6/2004 | Matsumoto et al. | 349/141 |

* cited by examiner

*Primary Examiner*—Tarifur R. Chowdhury
*Assistant Examiner*—David Y. Chung
(74) *Attorney, Agent, or Firm*—Antonelli, Terry, Stout & Kraus, LLP

(57) ABSTRACT

An active matrix type liquid crystal display device includes, in each pixel, a semiconductor layer of a thin film transistor, a first insulating film formed on the semiconductor layer, a gate line formed on the first insulating film, a second insulating film formed on the gate line, and a drain line formed on the second insulating film. The bottom side of the gate line is opposed to the semiconductor layer with the first insulating film interposed therebetween, and the top side of the gate line is covered with a metal electrode formed on the second insulating film by the same process as used to form the drain line, whereby leakage electric fields from the gate line are shielded. Particularly when an IPS type liquid crystal display device using low temperature poly silicon TFTs is constructed in the above-described manner, a wide viewing angle and a bright display image are obtained.

14 Claims, 7 Drawing Sheets

LIQUID CRYSTAL DISPLAY DEVICE

BACKGROUND OF THE INVENTION

The present invention relates to a liquid crystal display device; and, more particularly, the invention relates to a liquid crystal display device of the active matrix type, such as a thin film transistor (TFT) type, and a method of manufacture of the same.

A liquid crystal display device, particularly an in-plane-switching (hereinafter referred to as IPS) type of liquid crystal display device, in which a lateral electric field is applied to the liquid crystal gap between upper and lower substrates, is recognized as a display type that is capable of satisfying the demand for a high image quality, and various improvements have been made to the IPS type of liquid crystal display device for the purpose of further improving the image quality thereof.

One example of the IPS mode of liquid crystal display device is a type which switches a liquid crystal by means of a lateral electric field that is generated between two layers of metal electrodes having an insulating film interposed therebetween. This structure has the disadvantage that it is difficult to increase the pixel aperture ratio and the efficiency of utilization of light is low, as compared with a TN type (twisted nematic scheme) of display device. Since the luminance of the backlight must be increased to compensate for this disadvantage, it is difficult to lower the total power consumption of an LCD module to the extent required for notebook types of personal computers or portable terminals.

SUMMARY OF THE INVENTION

The IFS type of liquid crystal display device has a problem in that a higher aperture ratio, i.e., a higher transmissivity, is needed because of its low aperture ratio. An investigation made by the present inventor has shown that it is desirable to completely shield gate lines serving as electric-field generating sources, except for the pixel electrodes and common electrodes which constitute comb teeth-shaped electrodes, from the point of view of achieving a reduction in the non-uniformity of the image quality due to penetration of electric fields and the prevention of a decrease in contrast ratio due to light leakage.

Furthermore, it has been found that, in the IPS type of liquid crystal display device, the capacitance between the comb teeth-shaped electrodes, i.e., the liquid crystal capacitance, is small compared to that in the TN liquid crystal display device in which plane-shaped electrodes are opposed to each other with a liquid crystal layer interposed therebetween, and a large charge-holding capacitance is needed to prevent deterioration of the display quality due to potential variations, resulting in the problem that, if the charge-holding capacitance is increased for this reason, the aperture ratio decreases.

One object of the present invention is to solve the above-described problems and to provide a bright liquid crystal display device, in which shielding of the gate lines, which prevents malfunctions in the image display, is improved, the display quality is improved, and the aperture ratio is improved. Other advantages of the invention and other problems to be solved by the invention will become apparent from the following description.

Main aspects of the invention for solving such problems are as follows.

(1) A lateral electric field type of liquid crystal display device (active matrix type liquid crystal display device) includes a first substrate and a second substrate disposed in opposition to each other with a liquid crystal layer interposed therebetween, a plurality of gate lines formed on the first substrate, a plurality of drain lines formed to intersect the plurality of gate lines in a matrix array, thin film transistors respectively formed at intersections of the gate lines and the drain lines, and pixels each provided in an area surrounded by a pair of gate lines adjacent to one another and a pair of drain lines adjacent to one another.
(a) The first substrate includes, in each of the pixels, a semiconductor layer formed on the first substrate, a first insulating film formed on the semiconductor layer, a gate line formed on the first insulating film, a second insulating film formed on the gate line, a drain line formed on the second insulating film, a third insulating film formed on the drain line, and a common electrode or a common electrode line formed on the third insulating film. (b) The semiconductor layer is connected to a corresponding one of the thin film transistors near which one of the pair of the gate lines arranged adjacent to one another is formed, and it has an area which is formed under another of the pair of the gate lines arranged adjacent to one another with the first insulating film interposed therebetween.
(2) In the liquid crystal display device as described in paragraph (1), the semiconductor layer is formed under the other of the pair of the adjacent gate lines with the first insulating film interposed therebetween, and an electrode is formed over the other of the pair with at least the second insulating film interposed therebetween.
(3) In the liquid crystal display device as described in paragraph (2), the electrode is formed as a metal electrode.
(4) In the liquid crystal display device as described in paragraphs (2) or (3), a shield electrode for leakage electric fields from the another gate line is formed by the semiconductor layer formed under the another of the pair of the gate lines adjacent to one another with the first insulating film interposed therebetween and the electrode formed over the another gate line with at least the second insulating film interposed therebetween.
(5) In the liquid crystal display device as described in paragraphs (2) to (4), at least a side portion of the another of the pair of the gate lines adjacent to one another is, as seen in plan view, covered with the common electrode and the electrode formed with at least the second insulating film interposed between the electrode and the another of the pair.
(6) In the liquid crystal display device as described in any of paragraphs (1) to (5), the third insulating film is an organic film.
(7) In the liquid crystal display device as described in any of paragraphs (1) to (6), the common electrode formed on the third insulating film is a transparent electrode.
(8) In the liquid crystal display device as described in paragraphs (4), the insulating film interposed between the semiconductor layer and the electrode which constitutes the shield electrode is formed by stacking a gate insulating film of the thin film transistor and an interlayer insulating film which separates the gate line and the drain line.
(9) A lateral electric field type of liquid crystal display device (active matrix type liquid crystal display device) includes a first substrate and a second substrate disposed in opposition to each other with a liquid crystal layer interposed therebetween, a plurality of gate lines formed on the first substrate, a plurality of charge-holding lines, a plurality of drain lines formed to intersect the plurality of gate lines in matrix form, thin film transistors respectively formed at intersections of the gate lines and the drain lines, and pixels each provided in an area surrounded by a pair of gate lines adjacent to one another and a pair of drain lines adjacent to one another. (a) The first substrate includes, in each of the pixels, a semiconductor layer formed on the first substrate, a first insulating film formed on the semiconductor layer, a gate line formed on the first insulating film, a second insulating film formed on the gate line, a drain line formed on the second insulating film, a third insulating film formed on the drain line, and a common electrode formed on the third insulating film. (b) The charge-holding lines, each of which extends in an extending direction of a corresponding one of the drain lines, is provided under the corresponding drain line, and the common electrode which extends in an extending direction of each of the drain lines is provided over each of the drain lines.

(10) In the liquid crystal display device as described in paragraph (9), in each of the pixels, the semiconductor layer extends under the drain line and has an area which extends into a portion under a corresponding one of the charge-holding lines extending in the extending directions of the respective drain lines and forms a charge-holding capacitance.

(11) In the liquid crystal display device as described in paragraph (10), the semiconductor layer is connected to a corresponding one of the thin film transistors near which one of the pair of the gate lines adjacent to one another is formed, and has an area which is formed under another of the pair of the gate lines adjacent to one another with the first insulating film interposed therebetween, whereby the semiconductor layer forms a shield electrode for leakage electric fields with respect to one of the pair of the gate lines adjacent to one another, and forms a charge-holding capacitance with respect to the corresponding one of the charge-holding lines extending under the respective drain lines.

(12) In the liquid crystal display device as described in any of paragraphs (9) to (11), the charge-holding lines and the common lines are connected to one another outside a display area and are given the same potential.

(13) In the liquid crystal display device as described in any of paragraphs (1) to (12), the semiconductor layer connected to the thin film transistor is made of polysilicon (poly crystalline silicon film).

Further aspects of the invention will become apparent from the following description of various embodiments of the invention.

DETAILED DESCRIPTION OF THE EMBODIMENTS

Representative structures exhibiting the features of the invention will be described below with reference to various embodiments.

<Embodiment 1>

Figure 1:
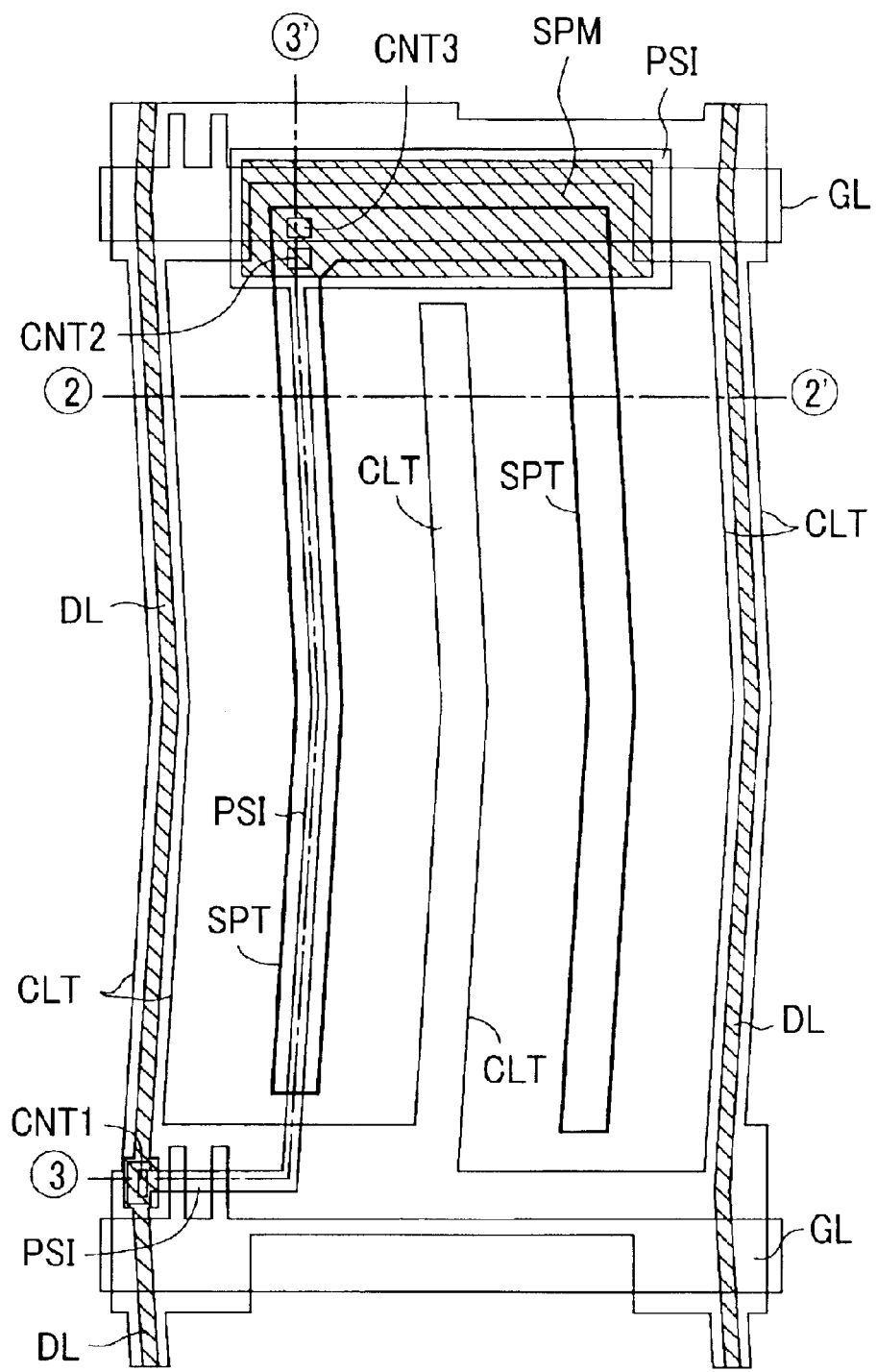
FIG. 1 is a plan view of a portion of a pixel of a TFT liquid crystal display device according to a first embodiment of the invention.
Figure 2:
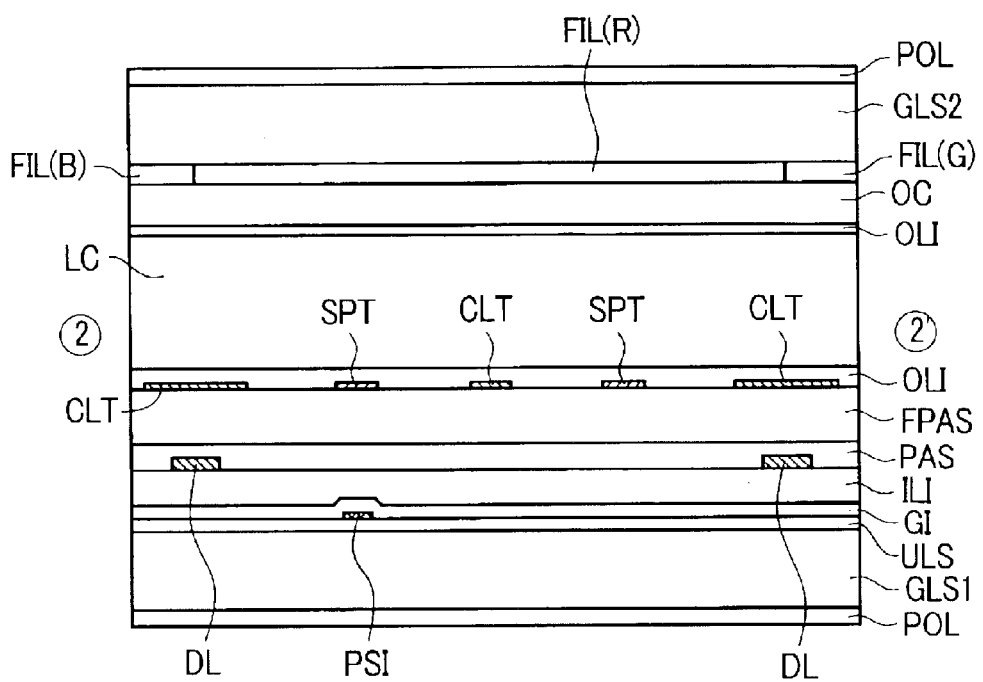
FIG. 2 is a cross-sectional view taken along line 2–2' of FIG. 1.
Figure 3:
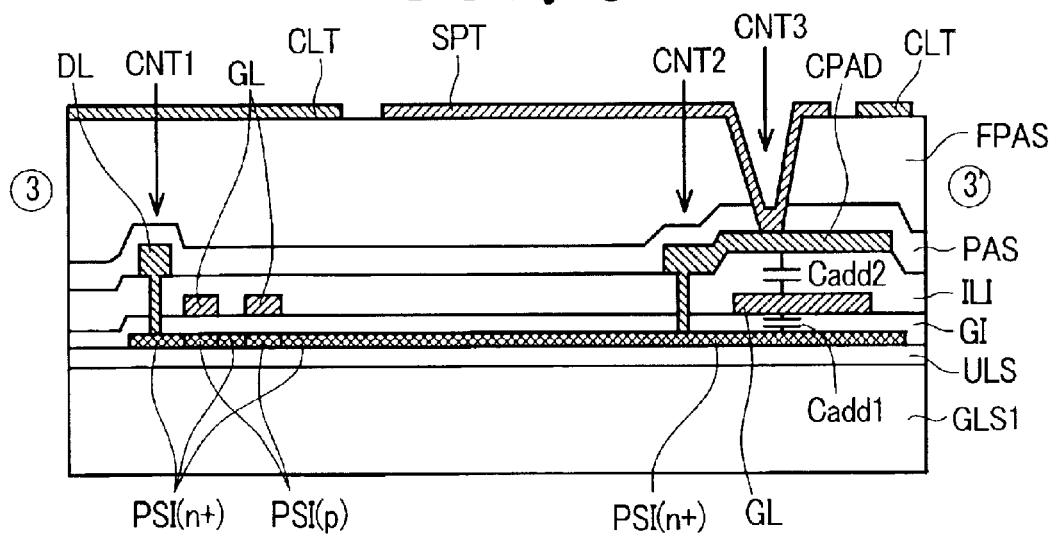
FIG. 3 is a cross-sectional view taken along line 3–3' of FIG. 1.

FIGS. 1 to 3 illustrate one of the pixels provided for a liquid crystal display device according to Embodiment 1 of the invention. FIGS. 2 and 3 are cross sections taken along lines 2–2' and 3–3' of FIG. 1, respectively. In FIGS. 1, 2 and 3, the numerals 2, 2', 3 and 3' are circled for the sake of clarity of illustration of the corresponding section lines. FIGS. 1, 2 and 3 show only the main elements of the pixel for the convenience of explanation, and for this reason the illustration of alignment films is omitted from part of FIGS. 1, 2 and 3. The illustration of the counter substrate is also omitted from FIGS. 1 and 3. Embodiment 1 will be described below in the order of FIGS. 1, 2 and 3.

FIG. 1 shows a planar pattern of the one of the pixels. Each one of the pixels is defined by surrounding mutually adjacent gate lines GL and mutually adjacent drain lines DL. One of the mutually adjacent gate lines GL functions as the gate electrode of a TFT, having a semiconductor layer made of poly silicon (poly-crystalline silicon) PSI, and it supplies voltages to turn the TFT on and off. For instance, a current supplied to a poly silicon PSI from a drain line DL shown on the left in FIG. 1 (one of the mutually adjacent drain lines) is supplied to a liquid crystal capacitance and hold capacitance (charge-holding capacitance helping the liquid crystal capacitance hold charge thereby) in the pixel to apply a video voltage (an image voltage, or a drain voltage) to each capacitance at the timing at which one of the mutually adjacent gate lines GL (shown at lower side of FIG. 1) applies a turn-on voltage to the poly silicon PSI (a portion thereof shown lower-left in FIG. 1). Consequently, the potentials of the low temperature poly silicon PSI, as extended into an area below another of the mutually adjacent gate lines GL (shown at upper side of FIG. 1), as well as the potentials of a metal electrode SPM and a transparent pixel electrode SPT connected thereto, are set to a video potential.

Since the other of the mutually adjacent gate lines GL contributes to the operation of another of the pixels, which is adjacent (in an extension direction of the drain line DL) to the one of the pixels (as FIG. 1 shows mainly), which the one of the mutually adjacent gate lines GL contributes to operation of, the other of the mutually adjacent gate lines GL is denoted as "a gate line of a prior stage (or a prior stage gate line)" hereinafter. This denotation is based on the assumption that the other of the pixels (partially shown in upper side of FIG. 1) is scanned prior to the one of the pixels; and if, the other of the pixels is scanned next to the one of the pixels, the gate line of the prior stage is renamed "a gate wiring line of a next stage (or a next stage gate line)". On the other hand, the one of the mutually adjacent gate lines GL scanning the one of the pixels (i.e. a pixel mainly exemplified in an explanation of an embodiment) is also denoted as "the gate wiring line of the present stage (or the present stage gate line)". However, the scanning sequence of the one of the pixels and the other of the pixels is not limited in this embodiment.

The flow of the current from the drain line DL follows the lead to the poly silicon PSI through a first contact hole CNT1, and the current in the poly silicon PSI flows into the metal pixel electrode SPM through a second contact hole CNT2 provided in the vicinity of the gate line of the prior stage. The poly silicon PSI extends through an area below the transparent pixel electrode SPT in a direction along the gate lines GL, and it is embedded in the area below the gate line of the prior stage. The metal pixel electrode SPM is connected at the second contact hole CNT2, and it covers part of the top of the gate line of the prior stage.

The portion of the transparent pixel electrode SPT that is disposed on an organic insulating film is connected to the metal pixel electrode SPM via a third contact hole CNT3, which is opened in the organic insulating film at a location above the metal pixel electrode SPM, whereby the transparent pixel electrode SPT is arranged in a U-shaped planar form within the one pixel.

The common electrode potential of an electrode CLT, which constitutes a terminal electrode for the liquid crystal capacitance, together with the transparent pixel electrode SPT, is applied through the following passage. A transparent common electrode line CLT is disposed over the opposite ends of each of the gate lines GL and each of the drain lines DL to shield these lines GL and DL with an insulating film of low dielectric constant, interposed between the transparent common electrode line CLT and the lines GL and DL. The transparent common electrode line CLT branches off into the pixel, and it serves the role of a common electrode for driving the liquid crystal LC in cooperation with the transparent pixel electrode SFT. In this manner, the transparent common electrode line CLT is disposed in a mesh-like form to cover the gate lines GL and the drain lines DL, and it is connected to a low-resistance metal line (not shown) in a peripheral area of the screen. This low-resistance metal line works as a bus line for the common potential.

In the IPS type liquid crystal display device, the value defined by the lateral electric fields between the transparent common electrode line CLT and the transparent pixel electrode SPT shown in FIG. 1 becomes a liquid crystal capacitance, and, therefore, the value is not larger than half the value obtained in a vertical electric field type of liquid crystal display device, such as a TN type, which defines the liquid crystal capacitance between electrodes disposed on mutually opposed upper and lower substrates. Accordingly, only in the lateral electric field type, in which common electrodes and pixel electrodes are provided on either one of mutually opposed substrates, can interconnection delays be reduced and good image quality be obtained, even if a transparent electrode material having a high resistance value, such as Indium Tin Oxide (ITO), is used as the interconnection-line resistance specifications of the transparent common electrode line CLT. As a matter of course, other transparent electrode materials, such as Indium Zinc Oxide (IZO) and Indium Tin Zinc Oxide (ITZO), may be used.

The potential of the common electrode and the common electrode line is set to, for example, an approximately mid-point potential of a pixel potential to be AC-driven every frame (a detailed description will be given later in connection with FIG.12). The pixel electrode potential arid the common electrode potential constitute the liquid crystal capacitance, and the potential difference between the pixel electrode and the common electrode causes electric fields to be generated in a liquid crystal layer, whereby an image is displayed by means of the video voltage supplied from the above-described drain line DL and the above-described common voltage. On the other hand, the potential of the hold capacitance is formed between the pixel electrode and the gate line GL, which is disposed at the prior stage arid is being scanned. After the gate line of the prior stage has been scanned, the previous-stage gate line GL is held at a stable constant potential when the gate line GL for the TFT to drive the corresponding pixel at the next stage is being scanned. Accordingly, the previous-stage gate line GL serves as an electrode which constitutes the hold capacitance.

The main transparent part shown in FIG. 1 is formed of four opening portions arranged along line 2–2'. Each of the opening portions will be described below in detail with reference to FIG. 2, which is a cross-sectional view taken along line 2–2' of FIG. 1, and which shows a section transverse to one pixel area between the mutually adjacent drain lines DL. A base insulating film ULS, which is made of a $Si_3N_4$ film having a thickness of 50 nm and a $SiO_2$ film having a thickness of 120 nm, is formed on a non-alkali TFT glass substrate GLS1 having a strain point of about 670° C. The base insulating film ULS has the role of preventing diffusion of impurities, such as Na, from the TFT glass substrate GLS1. A gate insulating film GI made of $SiO_2$ is formed on the base insulating film ULS. The low temperature poly silicon PSI for supplying the pixel potential is disposed on the gate insulating film GI. This low temperature poly silicon is an interconnection line formed as a poly-crystalline film of silicon, and it is formed in such a way that an amorphous silicon film formed on the gate insulating film GI is poly-crystallized at a comparatively low temperature, for example, by laser annealing. The term "low temperature poly silicon" which will be used in the following description also indicates a silicon film poly-crystallized at a low processing temperature in the above-described manner, or an interconnection layer formed of such a silicon film.

An interlayer insulating film ILI made of $SiO_2$ is formed to cover all of the above-described films. The drain lines DL, each consisting of a three-layer metal film, such as Ti/Al/Ti, is formed on the interlayer insulating film ILI.

The interlayer insulating film ILI and the drain lines DL are covered with a protective insulating film PAS, that is made of $Si_3N_4$ with a thickness of 200 nm and an organic protective film FPAS with a thickness of 2 $\mu$m, which essentially contains an acrylic resin. The transparent common electrode line CLT, which is wider than each of the drain lines DL and is made of Indium Tin Oxide (ITO), is formed on the organic protective film FPAS. The transparent pixel electrode SPT made of ITO, which is formed by the same process and of the same material as the transparent common electrode line CLT, is also formed on the organic protective film FPAS.

In the above description, the material of the interconnection line is not particularly limitative.

The main transparent part includes the following four areas: (1) the area between the transparent common electrode line CLT disposed over the drain line DL (the left-hand one of the drain lines DL shown in FIG. 1) and the transparent pixel electrode SPT disposed to cover the low temperature poly silicon PSI, as seen in the plan view of FIG. 1; (2) the area between the transparent pixel electrode SPT and the transparent common electrode line CLT extending vertically from the upper side of the gate line GL (the lower one of the gate lines GL shown in FIG. 1): (3) the area between the transparent common electrode line CLT and the transparent pixel electrode SPT; and (4) the area between the transparent pixel electrode SPT and the transparent common electrode line CLT disposed over the drain line DL (the right-hand one of the drain lines DL shown in FIG. 1). The transparent pixel electrode SPT and the transparent common electrode line CLT are electrodes for driving the liquid crystal LC.

The substrate which is opposed to the TFT glass substrate GLS1 to seal the liquid crystal LC is a color filter (CF) substrate GLS2. The CF glass substrate GLS2 has, on its liquid-crystal side, color filter elements FIL, each made of an organic film material in which a pigment for providing a color display is dispersed, and each of the color filter elements FIL is a color filter which represents transmitted light of blue (B), red (R) or green (G) color in response to a color assigned to the corresponding pixel (for example, a color filter for red is denoted by FIL(R)). An overcoat film OC made of an organic material is formed on the inside surfaces of the color filter elements CF. The overcoat film OC may also be omitted, but it is desirable to form the overcoat film OC for the purpose of improving the flatness of the CF glass substrate GLS2. Alignment films OLI are respectively printed on the surfaces of the CF substrate GLS2 and the TFT substrate GLS1 that are in contact with the liquid crystal LC, and predetermined rubbing is applied to the alignment films OLI to control an initial alignment direction. Polarizers POL are applied to the respective outside surfaces of the CF glass substrate GLS2 and the TFT glass substrate GLS1. These polarizers POL are arranged in a so-called crossed-Nicols state in which their polarizing axes are perpendicular to each other.

Figure 4:
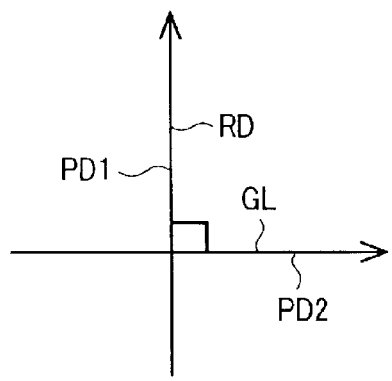
FIG. 4 is a diagram showing the relationship between a polarizer and an initial alignment direction in the first embodiment of the invention.

FIG. 4 shows the relationship between the direction of rubbing and the angle of each of the polarizers POL. One polarizing axis PD2 extends in the same direction as a gate-line axis GL, while another polarizing axis PD1 extends in a direction perpendicular to the gate-line axis GL. The rubbing direction RD is perpendicular to the gate-line axis GL on each of the upper and lower substrates GLS2 and GLS1. Accordingly, the polarizers POL are arranged in a normally black mode (a mode which display luminance is lowered as an electric field applied to a liquid crystal layer is lowered in voltage). In addition, a so-called multi-domain is realized by forming a pixel pattern having a bent shape, as shown in FIG. 1. As a matter of course, the ease of non-multi domain is also included in the scope of the present invention, and in this case as well, it is necessary to dispose polarizers in a crossed-Nicols arrangement.

As shown in FIG. 2 in cross section, a so-called black matrix BM is not formed on the CF glass substrate GLS2.

The colors of the respective color filters FIL are arrayed so that the color of each of the color filters FIL is coupled to the color of the next over any one of the transparent common electrode lines CLT disposed to cover the respective drain lines DL.

The width of the transparent common electrode line CLT, which covers the drain line DL, needs to be at least twice the width of the drain line DL. This is because the liquid crystal LC needs to be shielded from any electric field, other than the common electrode potential and the pixel potential, since the IPS liquid crystal display device basically tends to malfunction if such an electric field is applied to the liquid crystal LC. However, the shield width for the drain line DL need not be so complete as that for the gate line GL. This is because, as shown in the driving waveform diagram of FIG. 12, the amplitude of a drain line potential Vd is basically similar to the amplitude of a pixel electrode potential Vp and is smaller than the amplitude of a gate potential Vg which drives the gate line of a TFT.

In an IPS liquid crystal display device using a positive-type liquid crystal material (a liquid crystal material having a positive dielectric anisotropy), light is not transmitted through the middle portions of even the transparent electrodes. This is because no lateral electric fields are applied to the liquid crystal over electrodes of large width, so that the liquid crystal molecules do not rotate. Areas each of which extends 1.5 $\mu$m inward from a side edge of a transparent electrode in the width direction thereof transmits light because a fringe-like lateral electric field is applied to the area.

FIG. 3 is a cross-sectional view taken along line 3–3' of FIG. 1, showing a cross section of a shield structure for the TFT made of the low temperature poly silicon PSI and the gate line GL. The left-hand side of FIG. 3 shows a cross section of the TFT. The TFT is a so-called MOS TFT which uses the drain line DL and the metal pixel electrode SPM as so-called drain and source electrodes and the gate line GL as a gate electrode, and it has the gate insulating film GI. The low temperature poly silicon PSI is formed on the base insulating film ULS, and the drain line DL is connected to a heavily doped n-type layer $PSI(n^+)$ doped with phosphorus as an impurity in the low temperature poly silicon PSI, through the first contact hole CNT1 formed in the gate insulating film GI and the interlayer insulating film ILI. The heavily doped n-type layer $PSI(n^+)$ is high in conductivity and operates as an interconnection part in a pseudo manner. The low temperature poly silicon PSI under the gate line GL of the TFT region is a p-type layer PSI(p) doped with boron as an impurity, and it operates as a so-called semiconductor layer and exhibits the switching operation by assuming an electrically conductive state at an ON potential and by assuming an electrically non-conductive state at an OFF potential. When an ON voltage is applied to the gate line GL, the potential at the interface between the gate insulating film GI and the p-type layer PSI(p) doped with boron as an impurity under the gate line GL and under the gate insulating film GI is inverted to form a channel region, whereby the p-type layer PSI(p) is changed to an n-type layer, and an ON current flows in the TFT, so that a current flows into the metal pixel electrode SPM to charge the liquid crystal capacitance and the hold capacitance.

The gate line GL of the prior stage is shielded by the n-type poly silicon layer $PSI(n^+)$ and the metal electrode SPM connected to the n-type poly silicon layer $PSI(n^+)$ through the second contact hole CNT2, as shown on the right side of FIG. 3. The n-type poly silicon layer $PSI(n^+)$ extends from the TFT of the present stage and is embedded under the prior stage gate line GL with the gate insulating film GI interposed therebetween. The metal electrode SPM covers the interlayer insulating film ILI formed over the previous-stage gate line GL. The second contact hole CNT2 is formed through the interlayer insulating film ILI. As described previously, since any electric field other than the common electrode potential and the pixel potential relative to the produced images is the cause of malfunction of the IPS liquid crystal display device, the gate line GL is, as described above, shielded in the vertical direction by the n-type poly silicon PSI($n^+$) of pixel potential (source potential) and the metal pixel electrode SPM. Accordingly, it is possible to realize a high-quality liquid crystal display device that is free of malfunction.

The previous-stage gate line GL forms a hold capacitance (also called an additional capacitance) Cadd in which the gate line GL is used as one electrode, a stacked film of the gate insulating film GI and the interlayer insulating film ILI is used as an insulating film, and the n-type poly silicon PSI($n^+$) and the metal pixel electrode SPM are used as the other electrode. The metal pixel electrode SPM is formed by the same process and of the same material as the drain line DL. The n-type poly silicon layer PSI($n^+$) is given a pixel potential supplied from the drain line DL through the TFT, and the metal pixel electrode SPM is also similarly given the pixel potential.

The transparent pixel electrode SPT is supplied with the pixel potential from the metal pixel electrode SPM through the third contact hole CNT3 that is opened in the organic protective film FPAS and the protective film PAS made of SiN. The transparent common electrode line CLT and the metal pixel electrode SPM enhance the shielding effect by covering part of the gate line GL along one side thereof.

A plan view of the shield structure of the gate line GL will be described below in detail with reference to FIG. 1. The leakage potential from the gate line GL is securely shielded by any potential other than the gate potential, as seen in plan view. In FIG. 1, a completely shielded, as seen state in plan view, is realized by stacking the transparent common electrode line CLT and the metal pixel electrode SPM. The transparent pixel electrode SPT is formed above the metal pixel electrode SPM at the same level as the transparent common electrode line CLT. Accordingly, a space is provided between the transparent pixel electrode SPT and the transparent common electrode line CLT. This space is shielded by the metal pixel electrode SPM, as seen in plan view. In this manner, a complete shield is realized, as seen in plan view.

A hold capacitance Cadd is set so that the potential of the liquid crystal capacitance during an image display period (hold period) determined by the liquid crystal capacitance is held against a leakage current which increases owing to electrons and positive holes produced in the poly silicon PSI of the TFT by light irradiation from a display backlight through the TFT glass substrate GLS1. By setting the hold capacitance Cadd to a large value, it is possible to maintain the uniformity of a display picture at an extremely high level.

In Embodiment 1, a metal common electrode line, which is arranged in parallel with the gate line GL in the related art, is not provided. Therefore, a transparent area is formed even in a contact area in the central portion of the pixel. Accordingly, in Embodiment 1, far more transparent areas can be formed in each pixel, where it is possible to provide a far more visible liquid crystal display device.

The process of manufacture of the NMOS TFT shown in FIG. 3 will he described below with reference to FIGS. 5 to 10, as well as FIG. 3.

A non-alkali TFT glass substrate GLS1, which has a thickness of 0.7 mm, a size of 730 mm×920 mm and a strain point of about 670° C., is deaned, and, then, a $Si_3N_4$ film having a thickness of 50 nm is formed on the TFT glass substrate GLS1 by a plasma CVD method using a mixed gas of $SiH_4$, $NH_3$ and $N_2$. Then, a $SiO_2$ film having a thickness of 120 nm is stacked on the $Si_3N_4$ film by a plasma CVD method using a mixed gas of tetraethoxysilane and $O_2$, thereby forming the base insulating film ULS. The base insulating film ULS serves to prevent diffusion of Na from the TFT glass substrate GLS1 into a poly-crystalline silicon film. The forming temperature of the $Si_3N_4$ film and the $SiO_2$ film is 400° C. Incidentally, in the description of the present specification, the semiconductor layer is represented as being poly-crystalline, but macro crystalline silicon, continuous grain silicon or amorphous silicon also may be used.

Then, an approximately intrinsic amorphous silicon hydride film having a thickness of 50 nm is formed on the base insulating film ULS by a plasma CVD method using a mixed gas of $SiH_4$ and Ar. The deposition temperature is 400° C., and the amount of hydrogen immediately after deposition is about 5 at%. Then, the glass substrate GLS1 is annealed at 450° C. for about 30 minutes to emit hydrogen from the amorphous silicon hydride film. The amount of hydrogen after annealing is about 1 at%.

Then, the amorphous silicon film is irradiated with an excimer laser beam LASER having a wavelength of 308 nm at a fluence of 400 mJ/cm$^2$ so as to melt and recrystallize the amorphous silicon film, thereby obtaining an approximately intrinsic poly-crystalline silicon film. At this time, the laser beam has a fine linear shape with a width of 0.3 mm and a length of 200 mm, and the amorphous silicon film is irradiated with the laser beam, while the laser beam is being moved at a 10-$\mu$m pitch on the glass substrate GLS1 in a direction approximately perpendicular to the longitudinal direction of the laser beam. The irradiation is performed in a nitrogen atmosphere.

Figure 5:
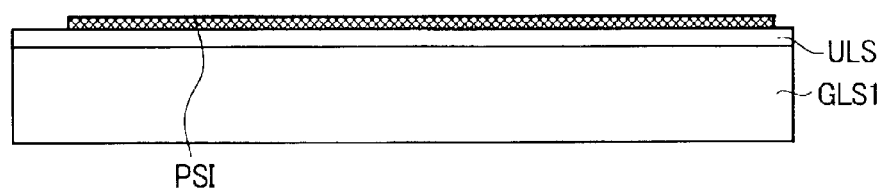
FIG. 5 is a cross-sectional view of a TFT substrate of the TFT liquid crystal display device according to the invention, as seen in a first step of the manufacture thereof.

Then, a predetermined resist pattern is formed on the poly-crystalline silicon film by an ordinary photolithography method, and the poly-crystalline silicon film PSI is machined into a predetermined shape by a reactive ion etching method using a mixed gas of $CF_4$ and $O_2$ (FIG. 5).

Then, a $SiO_2$ film having a thickness of 100 nm is formed by a plasma CVD method using a mixed gas of tetraethoxysilane (($C_2H_5)_4SiO_4$, also called TEOS) and oxygen, to obtain the gate insulating film GI. At this time, the mixture ratio of tetraethoxysilane and $O_2$ is 1:50, and the forming temperature is 400° C. Subsequently, B ions are implanted by ion implantation with an acceleration voltage of 33 KeV and a dose of 1E12 (cm$^{-2}$), to form a poly-silicon film PSI(p) of the channel region of the n-type TFT. Furthermore, a second photoresist pattern PRES is formed and P ions are implanted with an acceleration voltage of 60 KeV and a dose of 1E15(cm$^2$) into the portion of the polysilicon region PSI that serves as a lower shield electrode for a next-stage gate line, thereby forming an n-type poly-silicon PSI($n^+$)(FIG. 6).

Then, after a metal line, for example, a Mo or MoW film having a thickness of 200 nm has been formed by a sputtering method, a predetermined resist pattern is formed on the Mo film by an ordinary photolithography method, and the Mo film is machined into a predetermined shape by a wet etching method using a mixed acid, to obtain the scanning line GL.

Figure 7:
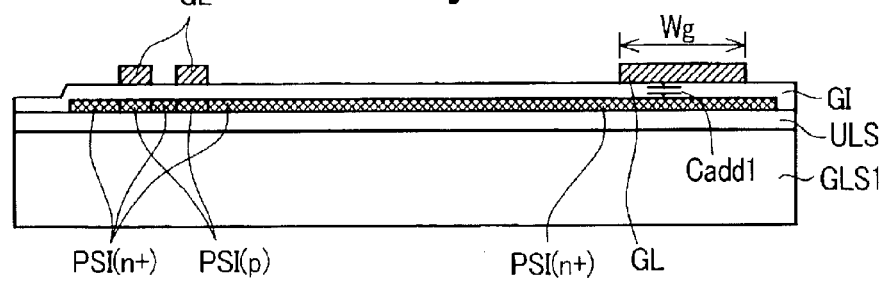
FIG. 7 is a cross-sectional view of the TFT substrate of the TFT liquid crystal display device according to the invention, as seen in a third step of the manufacture thereof.

P ions are implanted, with the resist pattern being used for etching being left, by ion implantation with an acceleration voltage of 60 KeV and a dose of 1E15(cm$^{-2}$), to form source and drain regions PSI($n^+$) of the n-type TFT (FIG. 7). In the above-described manner, the n⁺-type low temperature poly silicon film PSI(n⁺) for the source and drain of the n-type TFT and the poly-silicon film PSI(p) for the p-type channel region are formed. However, in the following manner, an n-type LDD region, which is lower in P ion concentration than the n⁺-type film, may be formed between the p-type film and the n⁺-type film, so that the leakage current of the TFT can be reduced (not shown). Namely, after the resist pattern that is used for etching has been removed, P ions are again implanted by ion implantation with an acceleration voltage of 65 KeV and a dose of 2E13 (cm⁻²), to form the LDD region of the n-type TFT. The length of the LDD region is determined by the amount of side etching of the wet-etched Mo film. In Embodiment 1, the length of the LDD region is about 0.8 μm. This length can be controlled by varying the overetching time of the Mo film.

Figure 6:
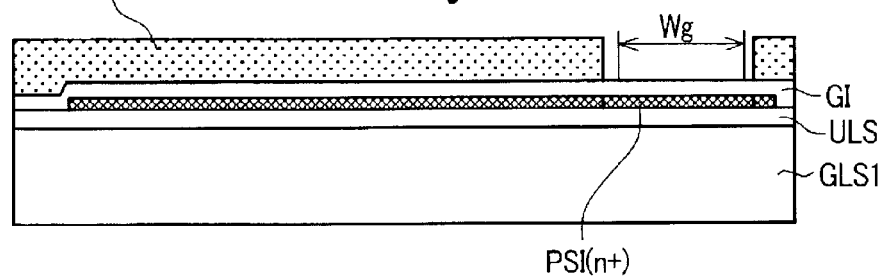
FIG. 6 is a cross-sectional view of the TFT substrate of the TFT liquid crystal display device according to the invention, as seen in a second step of the manufacture thereof.

At this time, by making the width Wg of the gate line GL smaller than the opening of the second photoresist pattern PRES shown in FIG. 6, it is possible to form an n⁺-type semiconductor under the gate line GL in a region constituting the hold capacitance Cadd. Accordingly, as shown in FIG. 7, a portion under the width Wg can also be brought to a low-resistance n⁺ state, whereby that portion can be formed as one electrode constituting the hold capacitance Cadd.

Then, the implanted impurities are activated by a rapid thermal annealing (RTA) method of irradiating the glass substrate GLS1 with the light of an excimer lamp or a metal halide lamp. Since annealing is performed with light containing a large amount of ultraviolet light, such as that of the excimer lamp or the metal halide lamp, only the poly-crystalline silicon layer PSI is selectively heated, whereby it is possible to avoid damage due to the heating of the glass substrate GLS1. The activation of the impurities can also be effected by a thermal treatment with a temperature of about 450° C. or more within the range in which substrate shrinkage, warping deformation or the like does not become a problem (FIG. 7).

Then, a SiO₂ film having a thickness of 500 nm is formed by a plasma CVD method using a mixed gas of tetraethoxysilane and oxygen, whereby an interlayer insulating film ILI is obtained. At this time, the mixture ratio of tetraethoxysilane and O₂ is 1:5, and the forming temperature is 350° C.

Figure 8:
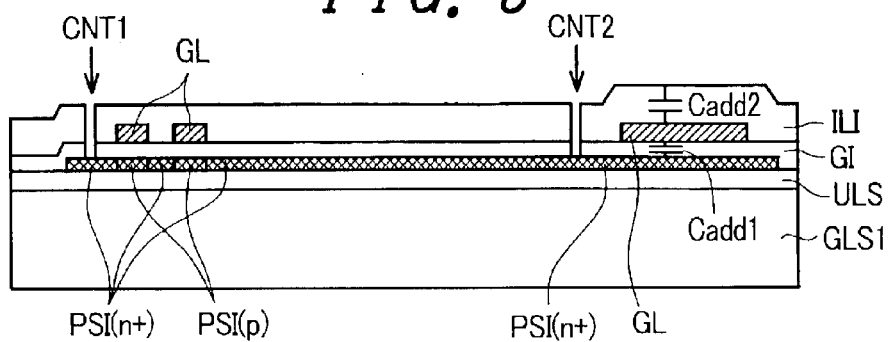
FIG. 8 is a cross-sectional view of the TFT substrate of the TFT liquid crystal display device according to the invention, as seen in a fourth step of the manufacture thereof.

Then, after a predetermined resist pattern has been formed, the first contact through-hole CNT1 and the second contact through-hole CNT2, shown in the plan view in FIG. 1, are formed in the interlayer insulating film ILI by a wet-etching method using a mixed acid (FIG. 8).

Figure 9:
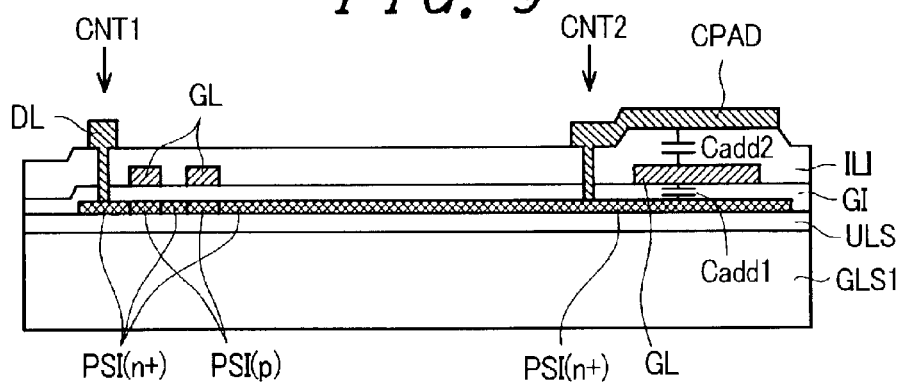
FIG. 9 is a cross-sectional view of the TFT substrate of the TFT liquid crystal display device according to the invention, as seen a fifth step of the manufacture thereof.

Subsequently, after a Ti film having a thickness of 50 nm, an Al-Si alloy having a thickness of 500 nm and a Ti film having a thickness 50 nm have been stacked in named order by a sputtering method, a predetermined resist pattern is formed on the stacked films and is collectively etched by a reactive ion etching method using a mixed gas of BCl₃ and Cl₂, thereby forming a drain line DL and a metal pixel electrode SPM (FIG. 9).

Figure 10:
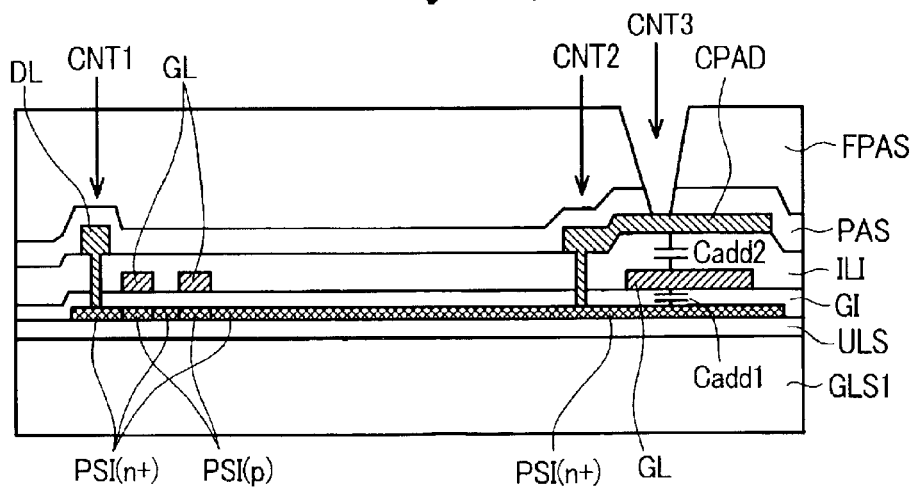
FIG. 10 is a cross-sectional view of the TFT substrate of the TFT liquid crystal display device according to the invention, as seen in a sixth step of the manufacture thereof.

A protective film PAS, which is a Si₃N₄ film having a thickness of 300 nm, is formed by a plasma CVD method using a mixed gas of SiH₄, NH₃ and N₂, and the protective film PAS is coated with an acrylic photosensitive resin to a thickness of about 3.5 μm by spin coating. The acrylic photosensitive resin film is exposed and developed using a predetermined mask to form a through-hole in the acrylic photosensitive resin film. Then, the acrylic resin is calcinated by being baked at 230° C. for 20 minutes to form a leveling organic protective film FPAS having a thickness of 2.0 μm. Subsequently, the through-hole pattern provided in the Organic protective film FPAS is used as a mask to machine the underlying Si₃N₄ film with a reactive ion etching method using CF₄, thereby forming a third contact hole CNT3 in the Si₃N₄ film (FIG. 10).

In this manner, two layers of films can be patterned through one photolithography process by machining the underlying insulating film using the organic protective film FPAS as a mask, whereby the process can be simplified.

Finally, a transparent conductive film having a thickness of 70 nm, such as an ITO film, is formed by a sputtering method and is machined into a predetermined shape by a wet-etching method using a mixed acid, to form the transparent common electrode line CLT and the transparent pixel electrode SPT. Thus, an active matrix substrate is completed (FIG. 3). The poly-crystalline silicon TFT is finished through the above-described seven photolithography processes.

Figure 11:
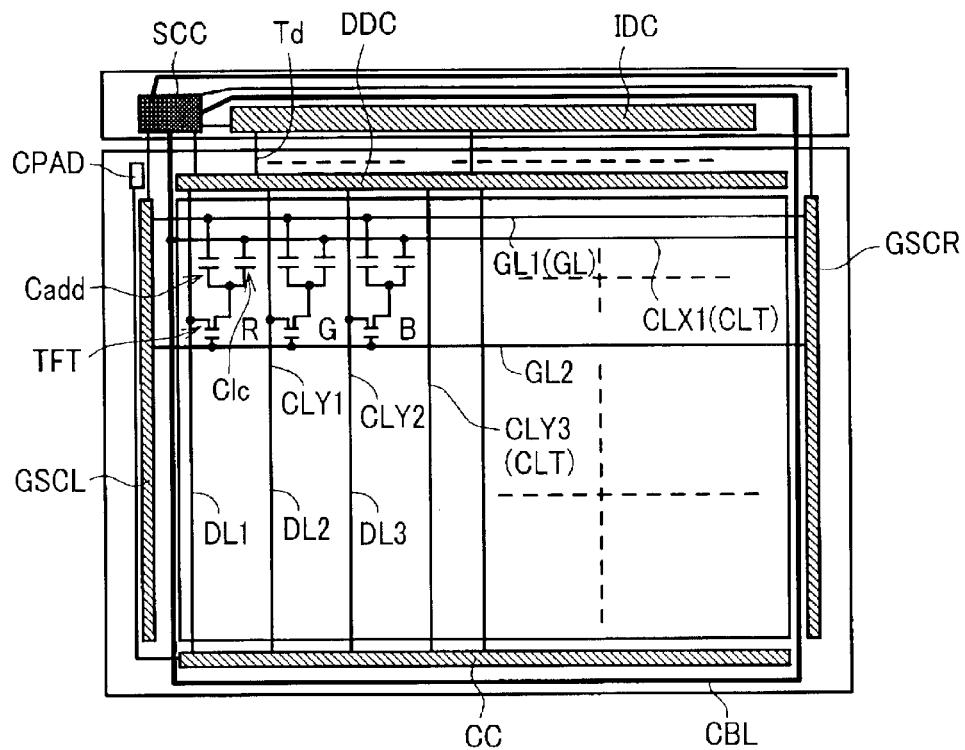
FIG. 11 is a plan view showing a schematic equivalent circuit of a TFT-LCD.

FIG. 11 is a connection diagram showing the equivalent circuit of a display matrix part and the peripheral circuit thereof, In FIG. 11, symbol DL generally denotes drain lines, and the drain lines (video signal lines) DL are respectively numbered in ascending order, such as DL1, DL2 and DL3, from the left of the screen. R, G and B indicate red, green and blue color pixels, respectively. Symbol GL generally denotes gate lines, and the gate lines GL are respectively numbered in ascending order, such as GL1, GL2 and GL3, from the top of the screen. Numbers 1 and 2 are appended to GL in accordance with the order of scanning timing. Symbols CLX and CLY generally denote the common electrode lines CLT, and the common electrode lines extending within the screen in the lateral direction are respectively numbered in ascending order, such as CLX1 and CLX2, from the top of the screen. Symbol CLY generally denotes the common electrode lines extending within the screen in the longitudinal direction, and these common electrode lines extending within the screen in the longitudinal direction are respectively numbered in ascending order, such as CLY1 and CLY2, from the top of the screen. Although the common electrode lines CLX and CLY are numbered for the convenience of illustration of the equivalent circuit, they are actually the transparent common electrode lines CLT, as shown in FIG. 1. Each of the common electrode lines CLX is a transparent electrode which covers part of one side of a respective one of the gate lines GL, while each of the common electrode lines CLY is a transparent electrode which covers a respective one of the drain lines DL. The common electrode lines CLT are disposed in a mesh-like form and are connected to a common electrode bus line CBL, which is disposed outside the area of the screen.

The gate lines GL are connected to a scanning circuit GSCL on the glass substrate GLS1, and electric power or timing signals are supplied to the scanning circuit GSCL from a power source and timing circuit SCC, which is formed on a printed circuit board outside the glass substrate GLS1. In addition to the scanning circuit GSCL formed of low temperature poly-silicon TFTs on the glass substrate GLS1, a scanning circuit GSCR formed of low temperature poly-silicon TFTs is disposed on the glass substrate GLS1, and the scanning circuits GSCL and GSCR are arranged to supply electric power to each of the gate lines (scanning lines) GL from both right and left sides thereof in order to increase redundancy. However, in consideration of screen size or the like, electric power may also be supplied from one side.

The drain signal lines DL are supplied with electric power from a signal circuit DDC formed of low-temperature polysilicon TFTs on the glass substrate GLS1. The signal circuit DDC has the function of distributing video data supplied from a circuit made of video signal circuit ICs on the glass substrate GLS1, in response to RGB color data. Accordingly, the number of connecting terminals of the signal circuit DDC on the glass substrate GLS1 is one third of the number of the drain lines DL in the screen.

In Embodiment 1, the transparent common electrode lines CLT are used as common electrode lines. As shown in FIG. 1, the transparent common electrode line CLT is disposed in a mesh-like form within the pixel. The common electrode lines CLX extend to the right and left of the screen and the common electrode lines CLY extend to the top and bottom of the screen, and the common electrode lines CLX and CLY are collectively connected to the common electrode bus line CBL of low impedance, and are connected to the power source and timing circuit SCC. These common electrode lines supply common potential to the pixels within the screen.

Each low temperature poly-silicon TFT in the screen is an n-type TFT, and when a gate voltage is applied to the corresponding one of the gate lines GL, a drain voltage (data) supplied to the corresponding one of the drain lines DL at this timing is supplied to a liquid crystal capacitance Clc between the common electrode line CLT and the drain line DL, thereby producing a display. In order to improve the capability to maintain the potential of the liquid crystal capacitance Clc during display periods, the hold capacitance Cadd is formed. Symbol CC denotes an inspection circuit which is formed of low temperature poly-silicon TFTs and is used to inspect disconnection of each of the drain signal lines DL. Symbol CPAD denotes an inspection terminal.

Figure 12:
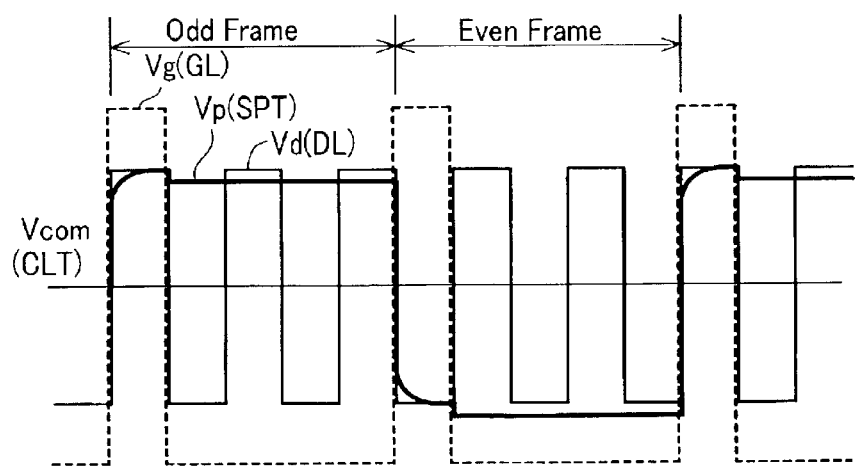
FIG. 12 is a timing chart showing the driving waveforms of pixels of the TFT-LCD.

FIG. 12 shows driving waveforms of the liquid crystal displace device of Embodiment 1. FIG. 12 shows an example in which a common electrode voltage Vcom is a direct-current voltage. The gate voltage Vg sequentially scans each of the gate lines GL, and when a voltage obtained by adding the threshold voltage of the low temperature poly-crystalline TFT of each of the pixels is applied to the drain potential Vd, the pixel TFT goes to its ON-state and the liquid crystal capacitance Clc shown in FIG. 11 is charged. The counter voltage Vcom, the gate voltage Vg and the drain voltage Vd are respectively applied to the transparent common electrode lines CLT which constitute the mesh-formed common electrode lines shown in FIG. 11, the gate lines GL, and the drain lines DL. In connection with Embodiment 1, the waveform of the drain voltage Vd shows, for example, the case where white display is provided by a liquid crystal display operating in a normally black mode. The gate lines GL are selected line by line, and the video signal voltage Vd is polarity-inverted between positive and negative levels with respect to the counter voltage Vcom for each of the lines. The pixel potential Vp is charged into the liquid crystal capacitance Clc through the TFT, but is polarity-inverted between odd and even frames with respect to the common electrode voltage Vcom. When a gate line GL connected to a TFT corresponding to a particular address is selected and the gate voltage Vg becomes larger than the drain voltage Vd, the liquid crystal capacitance Clc is charged with a potential corresponding to an image, but, as described previously, the potential of the liquid crystal capacitance Clc must be held until the drain voltage Vd, polarity-inverted with respect to the common electrode voltage Vcom, is applied during the next frame. The holding efficiency of the potential decreases as the OFF (leak) current of the TFT increases. To prevent a decrease of the holding efficiency, it is necessary to set the hold capacitance Cadd of the equivalent circuit shown in FIG. 11 to a large value.

<Embodiment 2>

Figure 13:
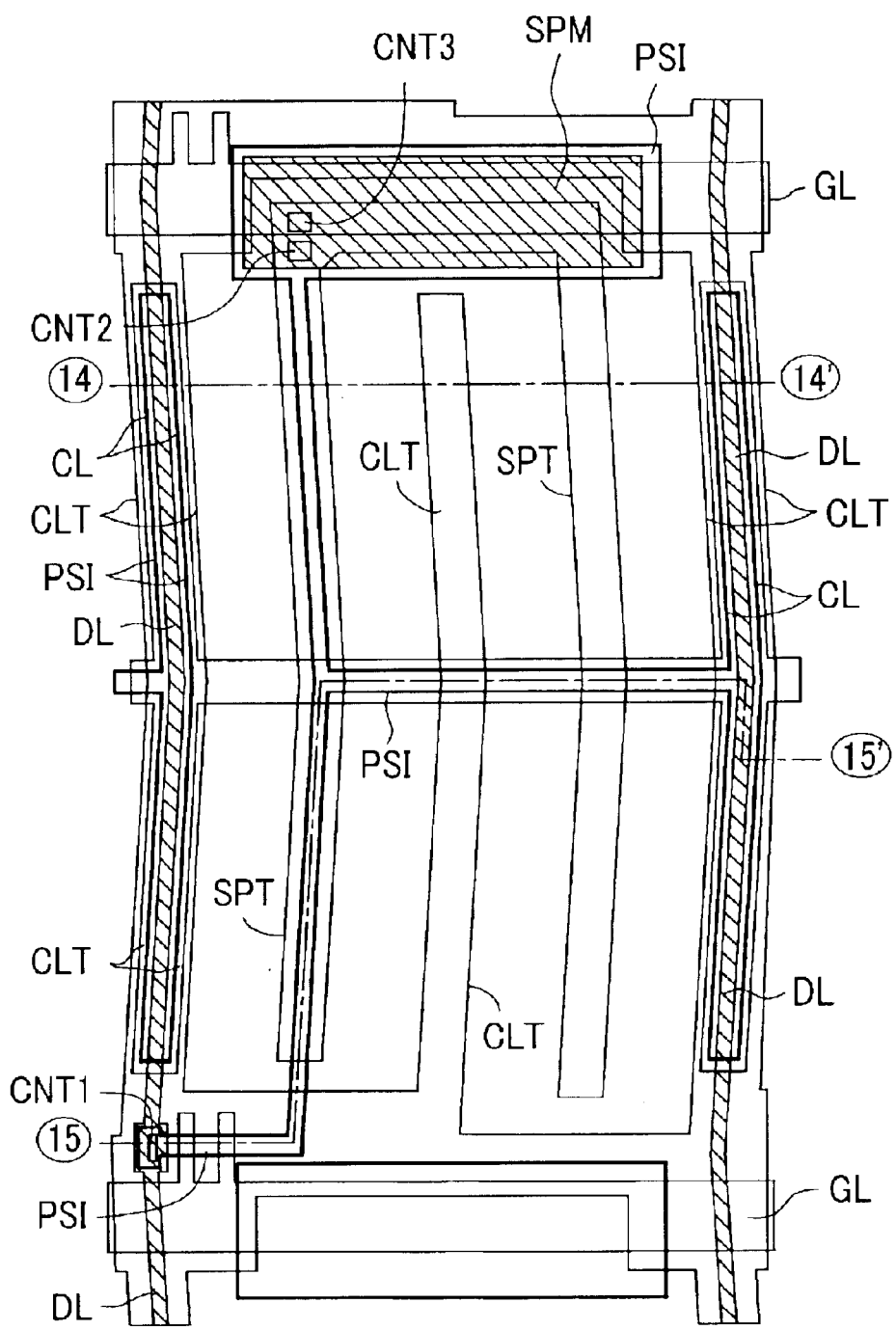
FIG. 13 is a plan view of a pixel of a TFT liquid crystal display device according to a second embodiment of the invention.
Figure 14:
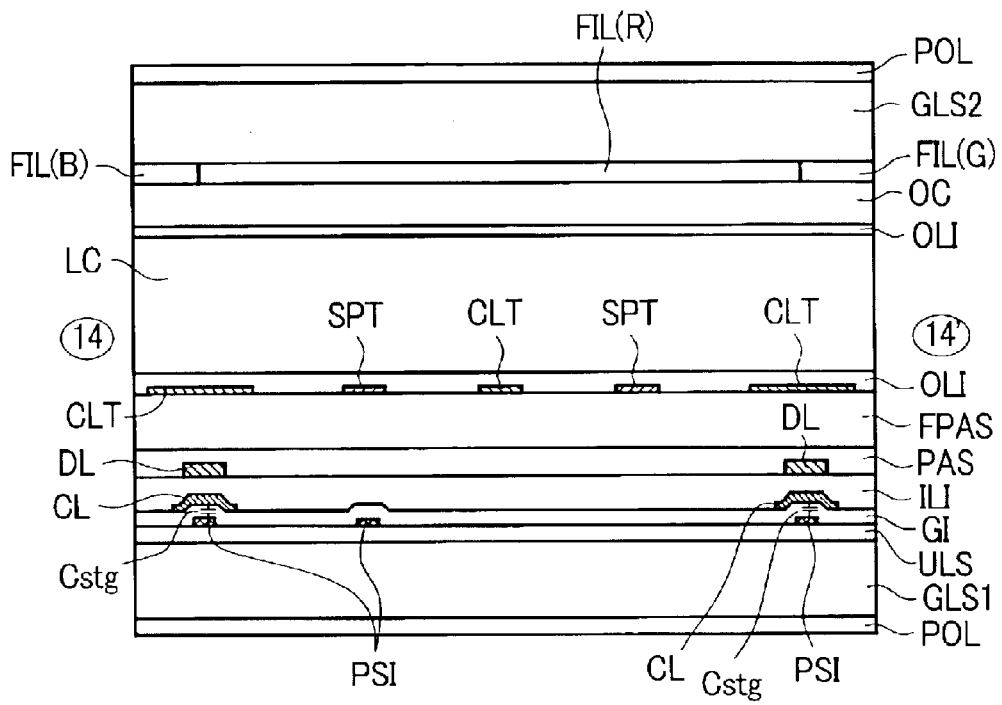
FIG. 14 is a cross-sectional view taken along a line 14–14' of FIG. 13 across adjacent drain lines.
Figure 15:
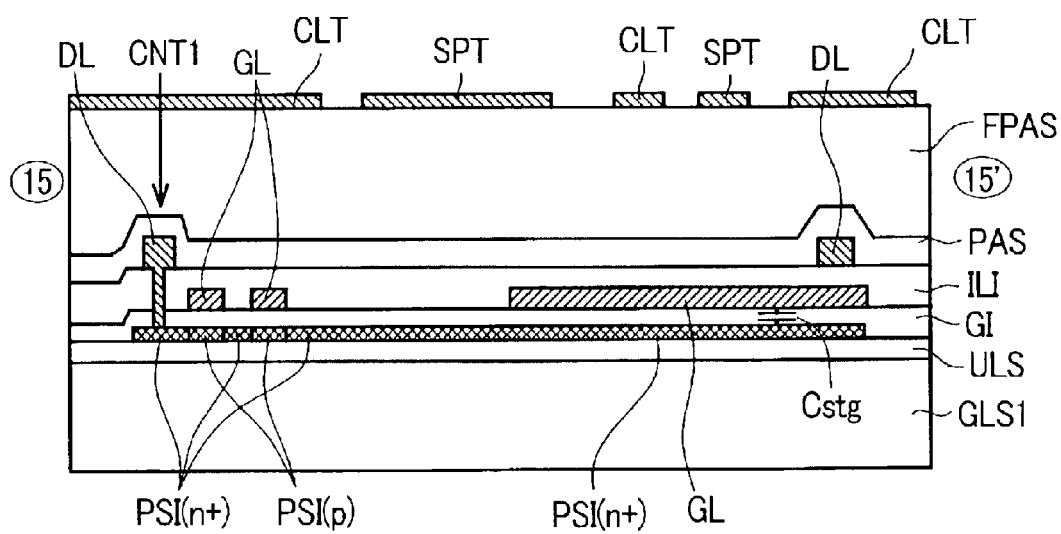
FIG. 15 is a cross-sectional view taken along a line 15–15' of FIG. 13.

FIG. 13 is a plan view of a pixel in a second embodiment of the invention. FIGS. 14 and 15 show cross sections taken along lines 14–14' and 15–15' of FIG. 13, respectively. In FIGS. 13, 14 and 15, the numerals 14, 14', 15 and 15' are circled for the sake of clarity of illustration of the corresponding section lines.

FIG. 13 shows an IPS type of pixel pattern having four main transparent parts arranged in a direction transverse to the drain lines DL similar to the case of Embodiment 1. As compared with Embodiment 1, one major feature of Embodiment 2 resides in the fact that a hold capacitance line (a charge-holding capacitance line) CL for supplying a common potential is disposed to extend through approximately the middle of one pixel in parallel with the gate line GL, and this hold capacitance line CL is arranged in an H-like form and is embedded under the drain line DL in one pixel area. Another major feature of Embodiment 2 resides in the fact that the low temperature poly silicon PSI, which is connected to the drain line DL through the first contact through-hole CNT1, is extended in such a manner as to be embedded in a portion under the transparent pixel electrode SPT, then in a portion under the hold capacitance line CL, and then in a portion underlying the hold capacitance line CL embedded in a portion under the drain line DL on the right-hand side of FIG. 13.

The former hold capacitance line CL of H-like form not only realizes a shield construction to shield the top and the bottom of the gate line GL in Embodiment 1, but also serves the role of completely eliminating display malfunctions by realizing a shield construction in which the top of the drain line DL is shielded by the transparent common electrode line CLT and the bottom of the drain line DL is shielded by the hold capacitance line CL. In the latter structure, in which the hold capacitance line CL is provided under the drain line DL and the low temperature poly silicon PSI is provided under the hold capacitance line CL, since the potential of the low temperature poly silicon PSI becomes the pixel potential, the hold capacitance (also called the capacitance element, or the storage capacitance) Cstg can be formed between the low temperature poly silicon PSI and the hold capacitance line CL. Accordingly, as compared with Embodiment 1, Embodiment 2 can reduce the hold capacitance Cadd between the low temperature poly silicon PSI and the previous-stage gate line GL, and provides the advantage of improving the aperture ratio. Details of the cross-sectional structure of Embodiment 2 are shown in FIGS. 14 and 15.

FIG. 14 shows a cross-sectional structure of the four transparent areas between the mutually adjacent drain lines DL. Embodiment 2 greatly differs from Embodiment 1 in the cross-sectional construction of a peripheral portion of each of the drain lines DL. Namely, in Embodiment 1, the drain lines DL are shielded by coating the transparent common electrode line CLT onto the stacked film of the protective film PAS and the organic protective film FPAS, which overlie the drain lines DL. On the other hand, in Embodiment 2, as shown in FIG. 14, the bottom of each of the drain lines DL is also shielded by the hold capacitance line CL formed by the same process and of the same material as the gate line GL. As one example, the hold capacitance line CL and the transparent common electrode line CLT are supplied with a constant common potential outside a display area. Accordingly, electric fields which leak from the drain lines into the transparent areas in the IPS type liquid crystal display device can be shielded to improve the display quality.

In addition, an $n^+$-type poly silicon layer PSI($n^+$) is formed in the portion underlying the hold capacitance line CL disposed in the portion under the drain line DL. This n+-type poly silicon layer PSI(n+) is supplied with the pixel potential from the TFT and forms the capacitance element Cstg by the use of the hold capacitance line CL and the gate insulating film GI. Accordingly, the hold capacitance (the capacitance element) Cstg within one pixel area can be increased without changing the width of the drain line DL or the overlying transparent common electrode line CLT. Accordingly, since the width of the gate line GL shown in FIG. 13 can be reduced, the aperture ratio can be increased.

FIG. 15 shows a cross-sectional portion which extends from the drain line DL (shown on the left-hand side of FIG. 15) to the TFT through the first contact through-hole CNT1, passes through a pixel-potential charging path to the n+-type poly silicon PSI(n+), and finally reaches a portion under the drain line DL (shown on the right-hand side of FIG. 15). A video voltage applied from the drain line DL through the first contact through-hole CNT1 forms a channel by applying an ON-voltage to the gate line GL of the TFT and a pixel potential is transmitted through the channel to the n+-type poly silicon PSI(n+) corresponding to the source electrode of the TUFT and charges the hold capacitance (the capacitance element) Cstg between the n+-type poly silicon PSI(n+) and the hold capacitance line CL, which is formed by the same process and of the same material as the gate line GL.

As described hereinabove in detail, according to the IPS display type of liquid crystal display device mainly made of low temperature poly silicon TFTs according to the present invention, it is possible to provide a liquid crystal display device which has a high display quality free of image malfunction, a high brightness and a high image quality.

What is claimed is:

1. An active matrix type liquid crystal display device of a lateral electric field type, comprising:
   a first substrate and a second substrate disposed in opposition to each other with a liquid crystal layer interposed therebetween;
   a plurality of gate lines formed on the first substrate;
   a plurality of drain lines formed to intersect the plurality of gate lines in matrix form;
   thin film transistors respectively formed with respect to intersections of the gate lines and the drain lines; and
   pixels, each provided in an area surrounded by a pair of adjacent gate lines and a pair of adjacent drain lines each of the pixels having:
   a semiconductor layer formed on the first substrate;
   a first insulating film formed on the semiconductor layer;
   a gate line formed on the first insulating film; a second insulating film formed on the gate line;
   a drain line formed on the second insulating film;
   a third insulating film formed on the drain line; and
   a common electrode or common electrode line formed on the third insulating film;
   the semiconductor layer being connected to a corresponding one of the thin film transistors near which one of the pair of the gate lines adjacent to one another is formed, and having an area which is formed under another of the pair of the gate lines adjacent to one another with the first insulating film interposed therebetween.

2. An active matrix type liquid crystal display device according to claim 1, wherein the semiconductor layer is formed under the other of the pair of adjacent gate lines with the first insulating film interposed therebetween, and an electrode is formed over the other of the pair of adjacent gate lines with at least the second insulating film interposed therebetween.

3. An active matrix type liquid crystal display device according to claim 2, wherein the electrode is a metal electrode formed with the second insulating film interposed between the electrode and the other gate line.

4. An active matrix type liquid crystal display device according to claim 2, wherein a shield electrode for leakage electric fields from the other gate line is formed by the semiconductor layer formed under the other of the pair of adjacent gate lines with the first insulating film interposed therebetween and the electrode formed over the other gate line with at least the second insulating film interposed therebetween.

5. An active matrix type liquid crystal display device according to claim 2, wherein at least a side portion of the other of the pair of adjacent gate lines is, a seen in plan view, covered with the common electrode and the electrode formed with at least the second insulating film interposed between the electrode and the other of the pair of adjacent gate lines.

6. An active matrix type liquid crystal display device according to claim 1, wherein the third insulating film is an organic film.

7. An active matrix type liquid crystal display device according to claim 1, wherein the common electrode formed on the third insulating film is a transparent electrode.

8. An active matrix type liquid crystal display device according to claim 4, wherein the insulating film interposed between the semiconductor layer and the electrode which constitutes a shield electrode is formed by stacking a gate insulating film of the thin film transistor and an interlayer insulating film which separates the gate line and the drain line.

9. An active matrix type liquid crystal display device of a lateral electric field type, comprising:
   a first substrate and a second substrate disposed in opposition to each other with a liquid crystal layer interposed therebetween;
   a plurality of gate lines formed on the first substrate;
   a plurality of charge-holding capacitance lines;
   a plurality of drain lines formed to intersect the plurality of gate lines in matrix form;
   thin film transistors respectively formed with respect to intersections of the gate lines and the drain lines; and
   pixels, each provided in an area surrounded by a pair of adjacent gate lines and a pair of adjacent drain lines;
   each of the pixels having:
   a semiconductor layer formed on the first substrate;
   a first insulating film formed on the semiconductor layer;
   a gate line formed on the first insulating film;
   a second insulating film formed on the gate line;
   a drain line formed on the second insulating film;
   a third insulating film formed on the drain line; and
   a common electrode formed on the third insulating film;
   the charge-holding capacitance lines, each of which extends in an extending direction of a corresponding one of the drain lines, being provided under a corresponding drain line; and
   the common electrode, which extends in an extending direction of each of the drain lines, being provided over each of the drain lines.

10. An active matrix type liquid crystal display device according to claim 9, wherein, in each of the pixels, the semiconductor layer extends under a drain line and has an area which extends into a portion under a corresponding one of the charge-holding capacitance lines extending in the extending directions of the respective drain lines and forms, a charge-holding capacitance.

11. An active matrix type liquid crystal display device according to claim 10, wherein the semiconductor layer is connected to a corresponding one of the thin film transistors near which one of the pair of adjacent gate lines is formed, and has an area which is formed under the other of the pair of adjacent gate lines with the first insulating film interposed therebetween, the semiconductor layer forming a shield electrode for leakage electric fields with respect to one of the pair of adjacent gate lines, and forming a charge-holding capacitance with respect to the corresponding one of the charge-holding capacitance lines extending under the respective drain lines.

12. An active matrix type liquid crystal display device according to claim 1, wherein the charge-holding lines and the common lines are connected to one another outside display area and are given the same potential.

13. An active matrix type liquid crystal display device according to claim 1, wherein the semiconductor layer connected to the thin film transistor is made of a polycrystalline silicon film.

14. An active matrix type liquid crystal display device according to claim 9, wherein the semiconductor layer connected to the thin film transistor is made of a polycrystalline silicon film.

* * * * *